United States Patent [19] [11] 3,871,765
Pramstraller [45] Mar. 18, 1975

[54] DEVICE FOR ADJUSTING FOCAL DISTANCE OF A PHOTOGRAPHIC ENLARGING APPARATUS

[75] Inventor: Wilmut Pramstraller, Brixen near Bozen, Italy

[73] Assignee: Durst S.p.A. Fabbrica Macchine ed Apparecchi Fototecnici, Bolzano-Bozen, Italy

[22] Filed: Sept. 26, 1973

[21] Appl. No.: 400,978

[30] Foreign Application Priority Data
Sept. 29, 1972 Italy.................................. 29868/72

[52] U.S. Cl.......................... 355/18, 355/55, 355/63
[51] Int. Cl. ........................................... G03b 27/32
[58] Field of Search...................... 355/18, 55, 61–63

[56] References Cited
UNITED STATES PATENTS
2,119,710   6/1938   Holder.................................. 355/63

Primary Examiner—Richard A. Wintercorn
Attorney, Agent, or Firm—Connolly and Hutz

[57] ABSTRACT

The fine adjustment movement of the projection head of a photographic enlarger is accomplished by turning a knob on the front of the head, which is connected through a disengageable clutch to a pinion gear engaged with a rack on the supporting column. A flexible belt drive connects the adjusting knob to the disengageable clutch so that the unclutching movement of one end of the belt can be accomplished without disengaging the other end connected to the adjusting knob. A toothed endless belt provides a positive drive to the clutch, which comprises a pair of discs detachably coupled by a pin and recess. The discs are maintained in engagement by a leaf spring having one end secured to the housing, which is deflected outwardly by a push rod cam to disengage the discs.

12 Claims, 5 Drawing Figures

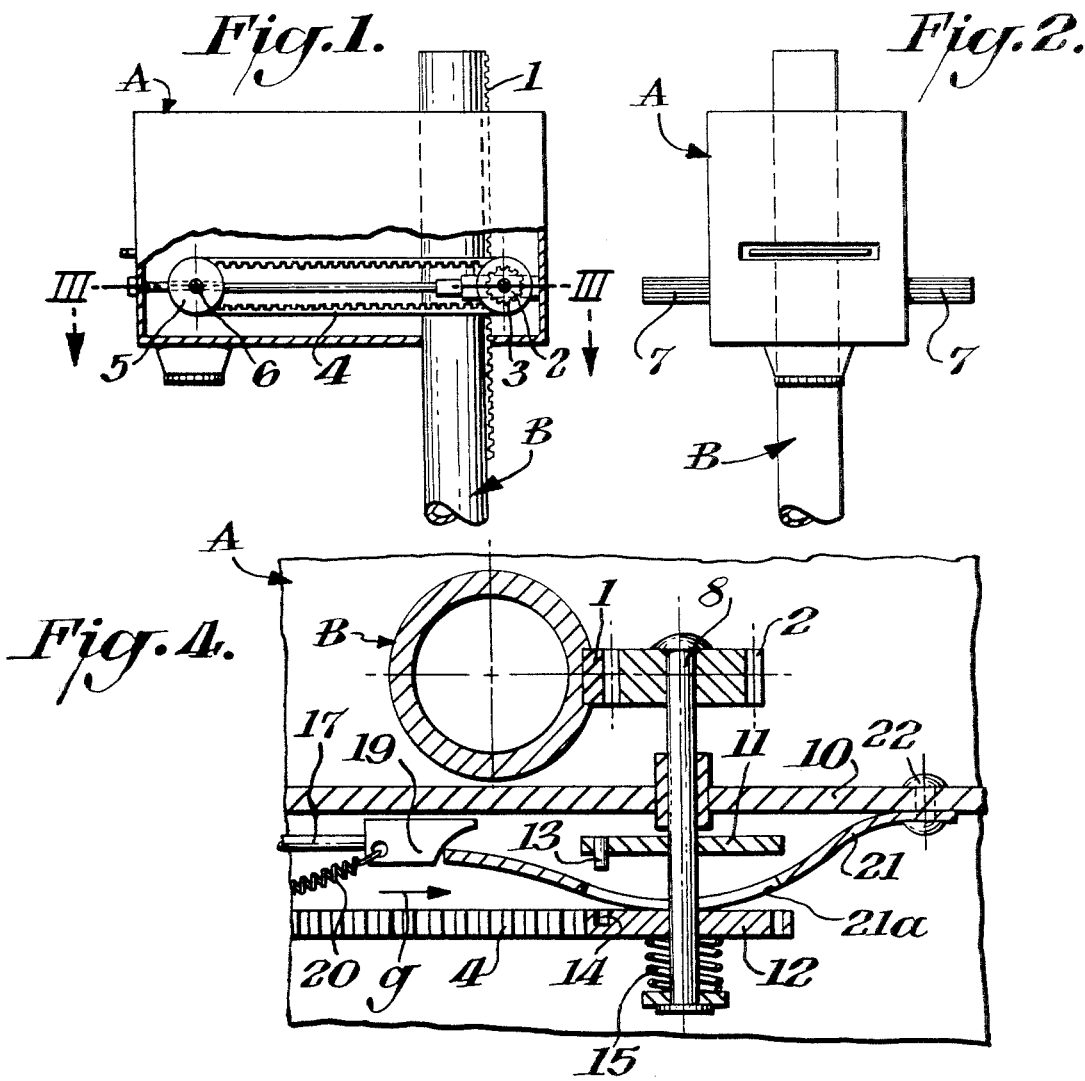
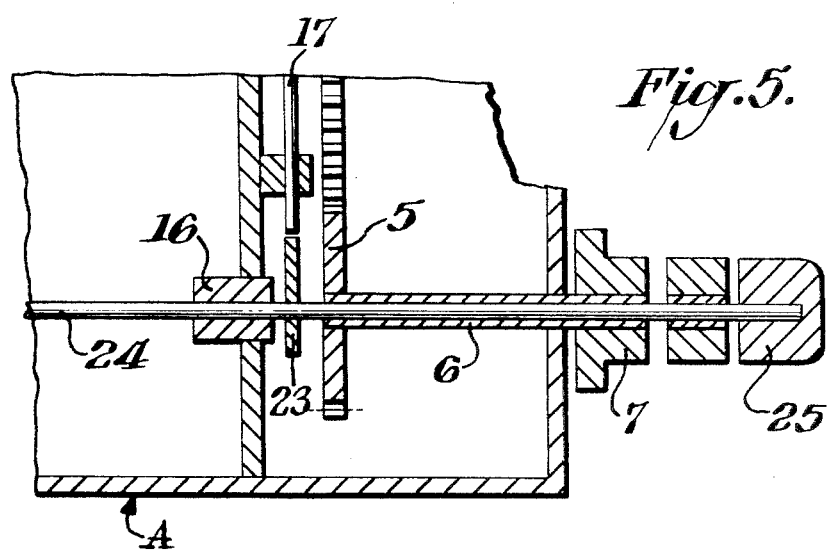

2

DEVICE FOR ADJUSTING FOCAL DISTANCE OF A PHOTOGRAPHIC ENLARGING APPARATUS

BACKGROUND OF THE INVENTION

This invention relates to an adjusting device for the lens or projection head of a photographic enlarging apparatus.

In most enlarging apparatus, wherein the lens head is arranged movably along a vertical guiding column, the adjusting movement of such apparatus is accomplished by turning a friction gear or a gear wheel, which engages with a geared rail mounted on the guiding column, for example. In enlarging apparatus with a large working stroke, the gear wheel is usually uncoupled during the coarse motion of the lens head, while only the fine setting of the head is undertaken with the gear wheel engaging with the gear rack.

The known adjusting devices are usually mounted at the rear of the lens head in the direct proximity to the vertical guiding column and may be activated only in this disadvantageous position. For this reason, the setting of the lens head in these enlarging apparatus is cumbersome, since the operator must always reach back to the farthest end of the head. With apparatus with a larger working stroke, it is even necessary for the operator to rise from a sitting working position in order to engage or disengage the gear wheel or the fine setting of the lens head.

A further disadvantage of the known setting devices is that the operator, in the carrying out of the fine setting, cannot view clearly the picture projected on the projection plane for setting the desired scale of magnification.

The object of this invention is to provide a device for the coarse setting as well as for fine setting of the projection head of an enlarging apparatus, which is particularly simple in its construction, affords a fail-safe, maintenance-free operation, and may be operated on the forward side of the projection head facing the operator.

SUMMARY

According to the invention, this problem is solved in that an adjusting wheel, in operative engagement with a vertical guiding column of the projection head, by the engagement of a clutch, may be turned by driving means activated from the forward side of the apparatus and that the clutch provided between the adjusting wheel and the driving means may be engaged and disengaged by an operating element, which also may be activated from the forward side of the projection head.

A suitable embodiment of the invention consists of having at least one turnable knob, arranged at the front of the projection head, for the driving of the adjusting wheel; on the shaft of the knob a driving wheel being mounted which is engaged with the driving means provided for the activation of the adjusting wheel.

In an advantageous manner, the driving means may comprise a flexible endless belt, such as: a V-belt, a toothed belt or a sprocket chain. As a further advantageous embodiment of the invention, it is suggested that the clutch may comprise a disc, mounted firmly on the shaft of the adjusting wheel, with which a second disc (longitudinally movable on the shaft and engaged with the driving means) may be brought into operating engagement.

In a further embodiment, it may be provided that the disc, movable longitudinally and mounted on the shaft, be urged by a spring unit in the direction of the stationary disc. Furthermore, it has been shown to be advantageous to provide between the stationary and the longitudinally movable discs a leaf spring, mounted on the housing of the projection head, which may be deflected for disengaging the two discs.

In an advantageous manner, the leaf spring is deflected by means of a push rod cam, movable longitudinally and operable from the front side of the projection head, by means of which the spring is deflected in the desired direction. This push rod structure, in a preferred embodiment, is maintained or returned into its rest position by a respective return spring.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a schematic side view in elevation of a projection head of a photographic enlarger partially in cross-section, upon which is mounted one embodiment of this invention, FIG. 2 is a schematic front view in elevation of the operating side of the projection head, FIG. 4 is an enlarged detail of a portion of FIG. 3 but with a disengaged clutch, and FIG. 5 is a cross-sectional view in elevation of a modified operating arrangement for the embodiment of the invention shown in FIGS. 1-4.

DESCRIPTION OF THE PREFERRED EMBODIMENT

Figure 3:
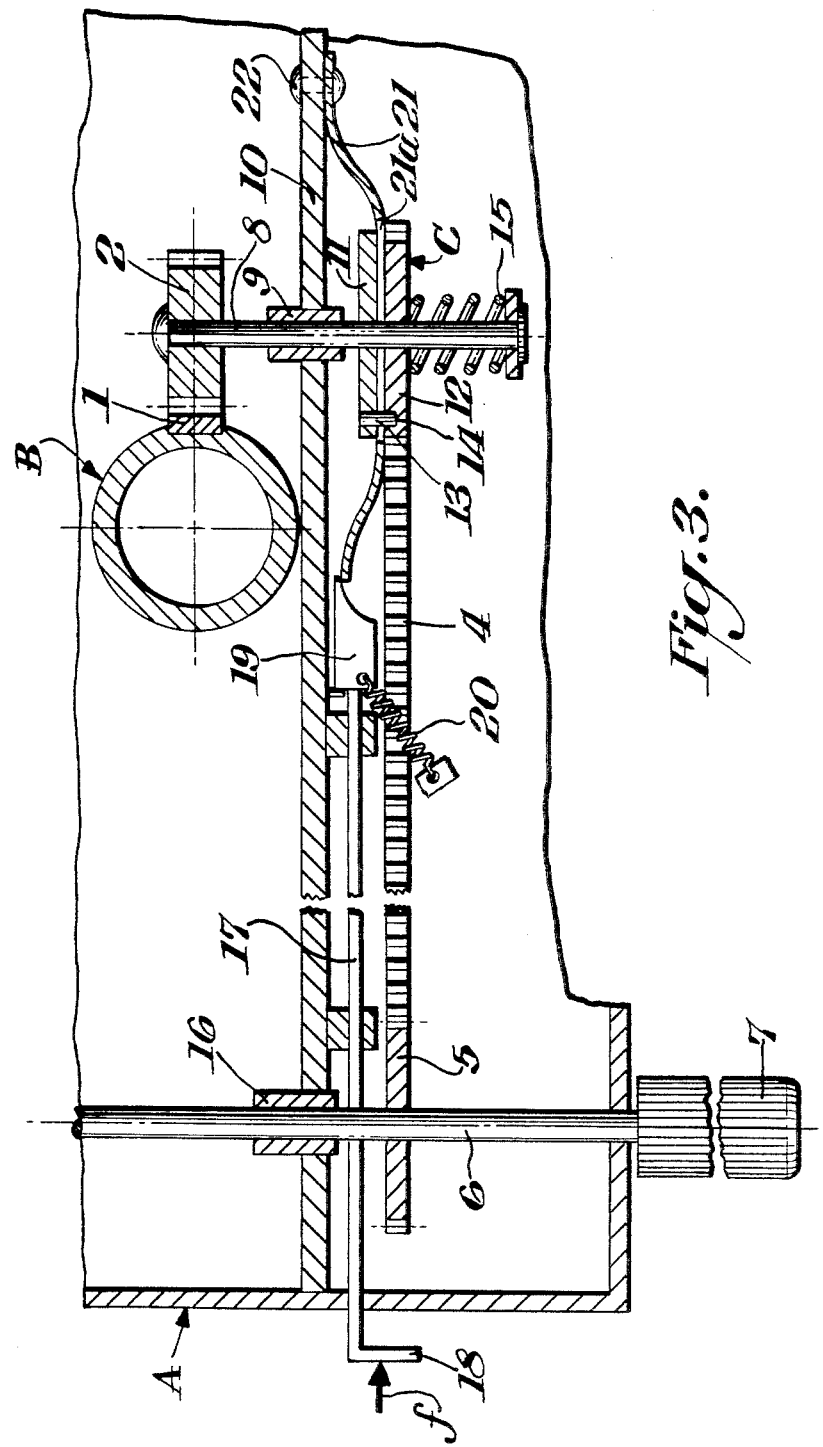
FIG. 3, is a cross-sectional view taken through FIG. 1 along the line III—III.

In FIG. 1 is shown a lens or projection head A of a photographic enlarging apparatus, which is arranged to be longitudinally movable on a vertical supporting or guiding column B. The guiding column B is provided with a rack 1 into which engages an adjusting wheel in the form of a gear wheel 2, which is arranged on the side opposite the operating side of the apparatus.

Connected with the gear wheel 2 is an endless belt pulley 3, driving means 4 being engaged therewith, e.g. an endless toothed belt, and which furthermore is in operating engagement with a driving wheel in the form of a pulley drive 5, provided in the direct proximity to the operating side of the projection head A. The pulley drive 5 is mounted on a shaft 6 and may be turned by at least one of the handles or knobs 7 (FIG. 2).

As shown in FIG. 3, the guiding column B has a rack 1 on its side disposed away from the operating side of the projection head A with which gear wheel 2 is engaged. Shaft 8, on which gear wheel 2 is firmly mounted, is inserted into a support bearing 9, which is provided in a side wall 10 of the projection head A. On the section of shaft 8 protruding from side wall 10 is arranged a clutch or disengageable coupling device C consisting of securely mounted disc 11 and a disc 12 movable in the direction of the longitudinal axis of shaft 8. Disc 11 is provided with at least one drop-in pin 13, which may be brought into operating contact with a recess or notched orifice 14 in disc 12.

Furthermore, on shaft 8 a spring element 15 is provided, which presses the movable disc 12 in the direction of the stationary disc 11 and thus endeavors to maintain both discs in a coupled position. The disc 12, movable in the longitudinal direction of shaft 8, is constructed as a geared belt pulley, a V-belt drive pulley or as a sprocket chain wheel and is engaged with an endless belt drive means 4. Drive means 4 is furthermore engaged with the belt pulley 5 opposite to disc 12, which is firmly mounted on shaft 6 of knob 7 provided in the immediate proximity of the operating side of projection head A.

In order to enable easy turning of shaft 6, it is arranged in a support bearing 16, which is inserted into the side wall 10 of projection head A.

Between side wall 10 and drive means 4, there is provided a push rod structure 17, which at its end facing the operating side of the projection head A is constructed as an actuating handle 18 and at its end facing the clutch C as a wedge-shaped pushing piece or pusher cam 19. By moving the push rod structure 17 in the direction of arrow f, by a thumb pressure of the operator whose hand grasps the handle 7, the push rod structure may be moved in the direction of clutch C.

The wedge-shaped pushing element 19 is in contact with a return spring 20, which maintains or returns into the rest position the push rod structure 17 as well as the wedge-shaped pushing element 19.

Between disc 11 and disc 12, there is provided a leaf spring 21, which is firmly connected with side wall 10 with one end by means of screws or rivets 22. The end of the leaf spring 21 opposite the illustrated rivet 22 is situated immediately before the pointed side of the wedge-shaped pushing element 19.

In order to enable, for the coarse setting of the lens head A, its easy movement along the vertical guiding column B, discs 11 and 12 are brought out of driving engagement with each other. For this purpose, as shown in FIG. 4, the push rod structure 17 together with the wedge-shaped pushing element 19 are moved in the direction of arrow g; the leaf spring 21 provided between disc 11 as a coupling disc and disc 12 as a coupling and drive disc is deflected to thus move disc 12 out from operating contact with drive means 4 against the force of spring element 15 in the longitudinal direction of shaft 8 to uncouple discs 11 and 12.

In this uncoupled position, projection head A may be directly moved up or down easily and in a simple manner, since only gear wheel 2 engaged with rack 1 must be moved.

If the pressure, exerted in the direction of arrow f (FIG. 3) on the actuating handle 18 of push rod structure 17, is removed, then the push rod structure 17 together with the wedge-shaped pushing element 19 is returned to its rest position by the return spring 20, which meanwhile had been stretched in the direction of arrow g during the longitudinal movement of the push rod structure. The leaf spring 21 is thereby released of tension and assumes its original straight position. Simultaneously, the spring element 15 presses disc 12 in the direction of disc 11, whereby drop-in-pin 13 again snaps into the recess or notched orifice 14 by disc 12.

Upon the engaging of the clutch, drive means 4 and consequently gear wheel 2 may be adjusted by turning knob 7 for the fine setting of the projection head A. In order not to impede the turning motion of disc 11 and 12 and of drop-in-pin 13 by leaf spring 21, spring 21 has a recess 21a. With a corresponding construction of the individual structural units, the clutch may also be arranged on shaft 6 of the operating side of the drive element.

The coupling device C may also be constructed without the click-stop or detent connection consisting of drop-in-pin 13 and notched orifice 14. In this instance, means with a high coefficient of friction are provided between disc 11 and 12, which may consist of one or more rubber discs, for example, to comprise a friction clutch.

The movement of push rod structure 17 may take place with the aid of an eccentric cam disc 23, mounted on a shaft 24 which is parallel to shaft 6 and actuated by a corresponding control grip 25.

FIG. 5 illustrates a particularly advantageous embodiment of the lastly stated actuating device, wherein shaft 24 is supported coaxially to shaft 6, and the rotatable knob 25 for moving eccentric disc 23 is disposed next to the rotatable knob 7 for the actuation of belt pulley 5.

What is claimed is:

1. An adjusting device for the movable head of a photographic apparatus mounted upon a guide column comprising an adjusting wheel in translating engagement with the guide column, an adjustment drive means actuatable from the front of the apparatus, a disengageable clutch between the adjustment drive means and the adjusting wheel, the disengageable clutch being constructed and arranged to be normally engaged to cause movement of the adjusting wheel in response to the movement of the adjustment drive means, an actuating element connected to the clutch for disengaging it to prevent movement of the adjustment drive means when the head is being moved relative to the guide column in a coarse adjusting movement whereby the adjustment drive means may be grasped together with the clutch actuating to effect such movement, and the actuating element being constructed and arranged to be actuated from the front of the apparatus.

2. The adjusting device of claim 1, wherein the adjustment drive means comprises at least one rotatable knob arranged at the front of the movable head.

3. An adjusting device for the movable head of a photographic apparatus mounted upon a guide column comprising an adjusting wheel in translating engagement with the guide column, an adjustment drive means actuatable from the front of the apparatus, a disengageable clutch between the adjustment drive means and the adjusting wheel, an actuating element connected to the clutch, the actuating element being constructed and arranged to be actuated from the front of the apparatus, the adjustment drive means comprising at least one rotatable knob arranged at the front of the movable head, and the drive means also comprising an endless belt drive whereby the end connected to the clutch may be deflected without interferring with its operation.

4. An adjusting device for the movable head of a photographic apparatus mounted upon a guide column comprising an adjusting wheel in translating engagement with the guide column, an adjustment drive means actuatable from the front of the apparatus, a disengageable clutch between the adjustment drive means and the adjusting wheel, an actuating element connected to the clutch, the actuating element being constructed and arranged to be actuated from the front of the apparatus, the clutch comprising a pair of discs, projection and recess means connecting the discs, resilient means for maintaining the discs engaged, and deflecting means for moving ghe discs apart to disengage them.

5. The adjusting device of claim 4, wherein only the one of the discs is movable, and a spring urges it toward the other disc.

6. The adjusting device of claim 5, wherein the spring comprises a leaf spring.

7. The adjusting device of claim 6, wherein the clutch is a friction clutch.

8. The adjusting device of claim 7, wherein the friction clutch comprises one or more friction inserts.

9. The adjusting device of claim 6, wherein the leaf spring is operatively associated with a longitudinally movable push rod cam which is operable from the front of the apparatus.

10. The adjusting device of claim 9, wherein the push rod cam is maintained in its rest position or is returned thereto by means of a return spring.

11. The adjusting device of claim 10, wherein the movement of the push rod cam occurs by a manually operable eccentric cam disc.

12. The adjusting device of claim 11, wherein the adjustment drive means is mounted on another shaft, and knobs for rotating each of the shafts being mounted next to each other.

* * * * *